US009213887B2

(12) United States Patent
Mitani

(10) Patent No.: US 9,213,887 B2
(45) Date of Patent: Dec. 15, 2015

(54) PROCESSING INFORMATION APPARATUS, CONTROL METHOD AND PROGRAM FOR INPUTTING AND STORING ADDITIONAL INFORMATION ACCORDING TO CONTENTS

(71) Applicant: CANON KABUSHIKI KAISHA, Tokyo (JP)

(72) Inventor: Shigeyuki Mitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/261,356

(22) Filed: Apr. 24, 2014

(65) Prior Publication Data

US 2014/0321721 A1    Oct. 30, 2014

(30) Foreign Application Priority Data

Apr. 26, 2013    (JP) .................................. 2013-094252

(51) Int. Cl.
*G06K 9/00*    (2006.01)
(52) U.S. Cl.
CPC ........ *G06K 9/00288* (2013.01); *G06K 9/00677* (2013.01)
(58) Field of Classification Search
CPC ....................... G06K 9/00228; G06K 9/00288
See application file for complete search history.

(56) References Cited

U.S. PATENT DOCUMENTS

| 2003/0198368 | A1* | 10/2003 | Kee ............................... 382/118 |
| 2012/0274562 | A1* | 11/2012 | Ps et al. ........................ 345/158 |
| 2013/0266194 | A1* | 10/2013 | Brookhart ..................... 382/118 |

FOREIGN PATENT DOCUMENTS

JP    2009-271887 A    11/2009

* cited by examiner

*Primary Examiner* — Siamak Harandi
(74) *Attorney, Agent, or Firm* — Canon U.S.A., Inc. IP Division

(57) ABSTRACT

The present invention aims to encourage the input of comment on content requiring the viewing user's input and prevent the comment from failing to be input in a case where the content is displayed and the viewing user inputs the comment on the content.

Therefore, according to the present invention, when the content is displayed on a display apparatus, the viewing user of the content is photographed to capture photographed image data. A face image included in the displayed content and the face image of the viewing user included in the photographed image data are compared, and, if they are similar, a comment input area is displayed to encourage the viewing user to input a comment.

17 Claims, 12 Drawing Sheets

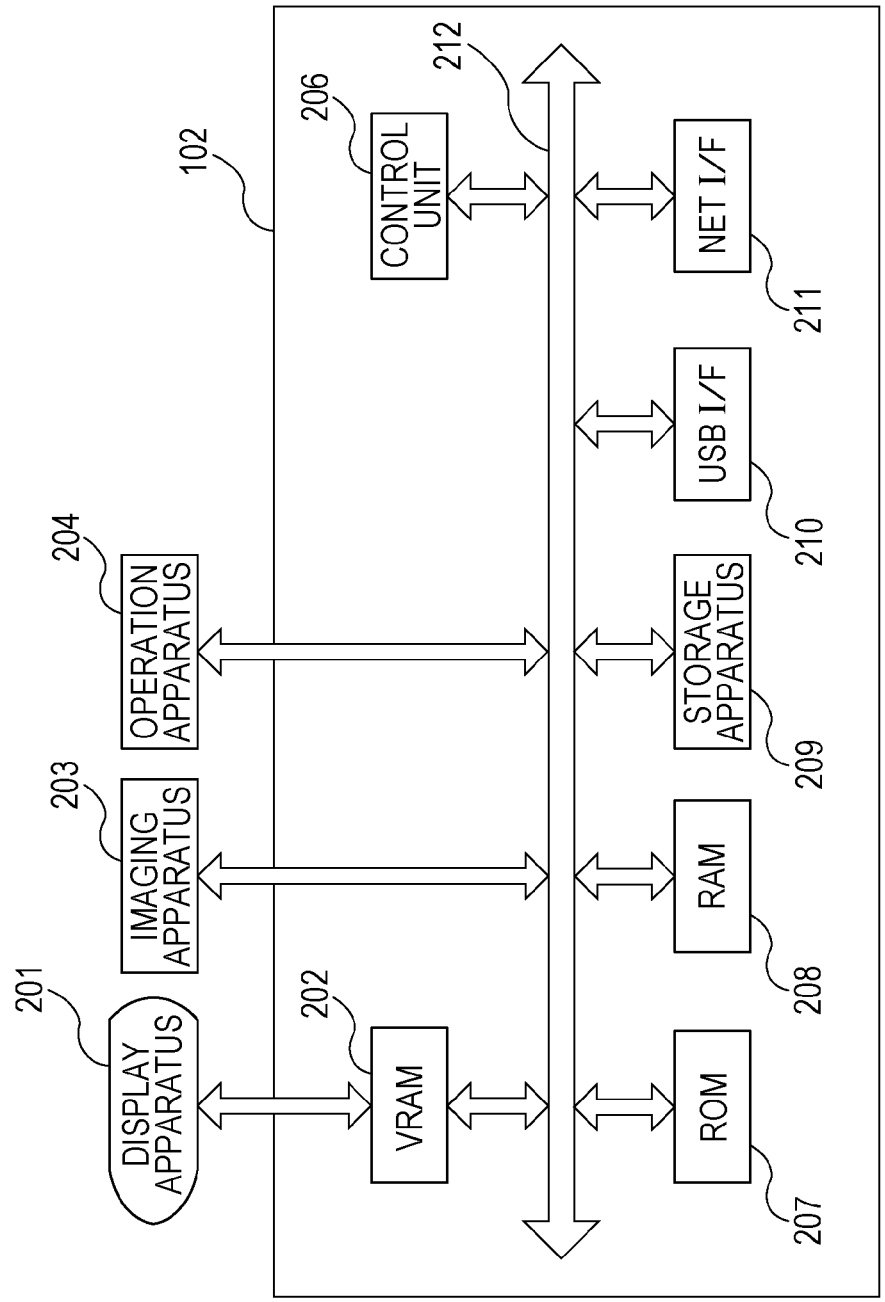

PROCESSING INFORMATION APPARATUS, CONTROL METHOD AND PROGRAM FOR INPUTTING AND STORING ADDITIONAL INFORMATION ACCORDING TO CONTENTS

BACKGROUND OF THE INVENTION

1. Field of the Invention

The present invention relates to a technique of inputting and storing additional information with respect to content when the content is played back.

2. Description of the Related Art

In the related art, when a web server provides a web page to a client terminal and the client terminal inputs a comment on the web page, the comment is added and displayed on the web page provided by the web server (Japanese Patent Application Laid-Open No. 2009-271887).

However, a large amount of contents including the web page are provided to the user of the client terminal and it is difficult to input a comment on all these contents. Moreover, it is also complicated for the user to determine whether to input a comment on each of such contents. Further, there occurs a state where the user of the client terminal misses content on which the user should input a comment, and fails to input the comment.

SUMMARY OF THE INVENTION

Therefore, an object of the present invention is to encourage a comment input to content on which the viewing user should input a comment, and prevent the comment from failing to be input.

Further features of the present invention will become apparent from the following description of exemplary embodiments (with reference to the attached drawings).

BRIEF DESCRIPTION OF THE DRAWINGS

FIG. 2 is a block diagram illustrating one configuration example of an information processing apparatus according to an embodiment of the present invention.

DESCRIPTION OF THE EMBODIMENTS

In the following, a preferred embodiment of this invention is exemplarily described in detail with reference to the drawings. However, components described in this embodiment are just exemplification and the range of this invention is not intended to be limited to them.

First Embodiment

Figure 1:
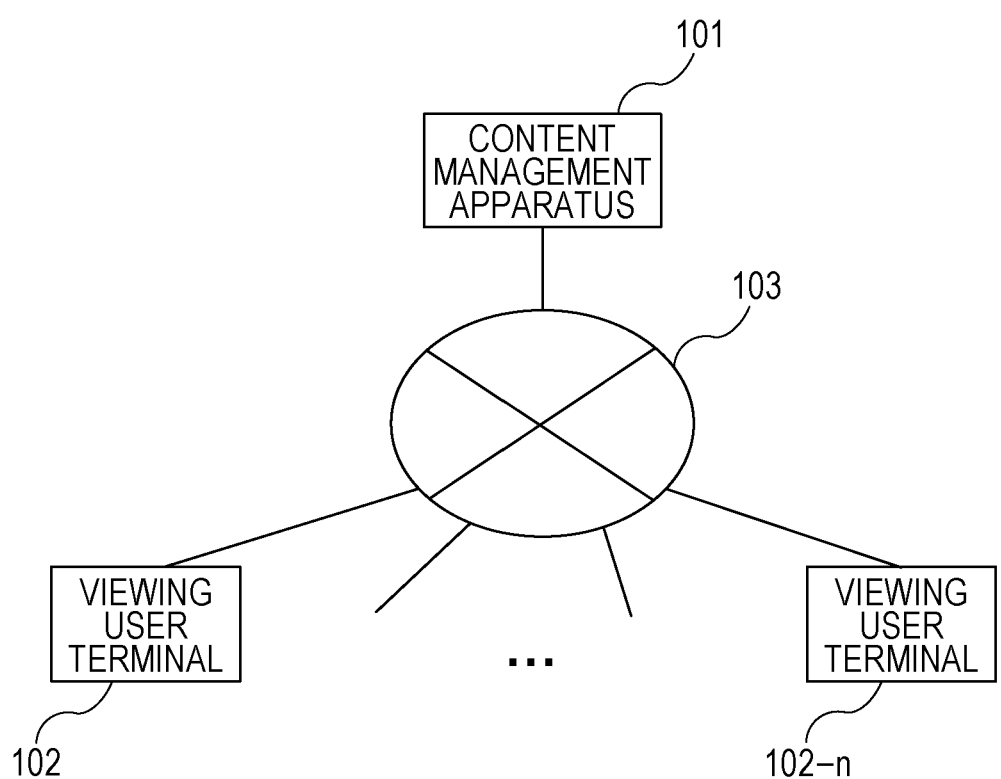
FIG. 1 is a block diagram illustrating one configuration example of a content appreciation system according to an embodiment of the present invention.

FIG. 1 is a schematic diagram illustrating one example of a content appreciation system of the present embodiment. A content management apparatus 101 manages contents such as image data, moving image data and music data, and provides them to a viewing user terminal 102. The content management apparatus 101 generates and transmits a web page including the contents to the viewing user terminal 102 such that it is possible to play back these contents on the screen of the viewing user terminal 102. A network 103 denotes an Internet network, an Intranet network or a public line network, and the content management apparatus 101 and the viewing user terminal 102 can perform communication through the network 103.

The content management apparatus 101 is implemented by a server computer. Moreover, the viewing user terminal is implemented by various information processing apparatuses including a communication function, such as a personal computer, a smart phone, a digital camera and a printer.

Here, in the content appreciation system of the present embodiment, although a case is exemplified where there are one content management apparatus 101 and multiple viewing user terminals 102, the numbers are not limited to these.

FIG. 2 is a block diagram illustrating one example of the hardware configuration of an information processing apparatus that implements the viewing user terminal 102 of the present embodiment. In a display apparatus 201, for example, an editing document, figure and image or other editing information, and an icon, a message, a menu or other user interface information are displayed on the screen. In the present embodiment, a content appreciation screen is displayed. The display apparatus 201 is implemented by, for example, a CRT (Cathode Ray Tube), an LCD (Liquid Crystal Display) or an EL (Electro Luminescent) display, and so on. A video RAM (VRAM) 202 draws an image to be displayed on the screen of the display apparatus 201. The image generated by this VRAM 202 is forwarded to the display apparatus 201 according to a predetermined rule, and, the image is displayed on the screen of the display apparatus 201. An imaging apparatus 203 generates image data by performing imaging processing on an object, and is implemented by a digital camera, and so on. The imaging apparatus 203 of the present embodiment performs imaging processing of the viewing user. An operation apparatus 204 inputs a character string, a command or a selection instruction, and so on, in response to the user's operation. The operation apparatus 204 of the present embodiment is used for the viewing user to input a character string of comment on content or instruct the switching of content or the end of content playback. The operation apparatus 204 is implemented by a keyboard, a pointing device or a touch panel, and so on.

A control unit 206 is implemented by a central processing unit (CPU) or the like, and, based on control programs stored in a read only memory (ROM) 207 and a storage apparatus 209, controls each device connected via a bus 212.

The ROM 207 holds various control programs and data. A random access memory (RAM) 208 has a work area of the control unit 206, a save area of data at the time of error processing and a load area of a control program, and so on. The storage apparatus 209 is implemented by a hard disk drive (HDD), a solid-state drive (SSD) formed with a flash memory or a hybrid drive using both the hard disk and the flash memory. The storage apparatus 209 can store various control programs and contents such as image data and text data. Moreover, for example, the storage apparatus 209 stores an operating system (OS), an application program, a DB management program and a table to manage various kinds of information, and so on.

A universal serial bus (USB) interface 220 is connected with external devices such as a USB thumb drive, a compact disc (CD) drive and a digital versatile disc (DVD) drive, and so on. Therefore, it is possible to expand the function of the information processing apparatus. A network interface 211 can perform communication with other information processing apparatuses and printers, and so on, by wired or wireless communication. The network interface 211 of the present embodiment is used for the viewing user terminal 102 to perform communication with the content management apparatus 101 through the network 103. Moreover, it is possible to receive the provision of a control program supplied from other information processing apparatuses or the like to the control unit 206 through the network interface 211.

In the present embodiment, a case is described where the content management apparatus 101 provides still image data to the viewing user terminal 102 as content and displays the still image data on the display apparatus 201 of the viewing user terminal 102 while sequentially switching the still image data one by one.

FIG. 3 is a diagram illustrating one example of a content appreciation screen of the present embodiment. The content appreciation screen is displayed on the display apparatus 201 of the viewing user terminal 102 and the viewing user is photographed by the imaging apparatus 203. The viewing user performs a desired operation on the content appreciation screen by using a button 304 or a touch panel installed on the display apparatus 201 as the operation apparatus 204. The touch panel has a function to detect a physical contact from the outside such as a pen and a viewing user's finger, and the position of the contact.

Figure 3A:
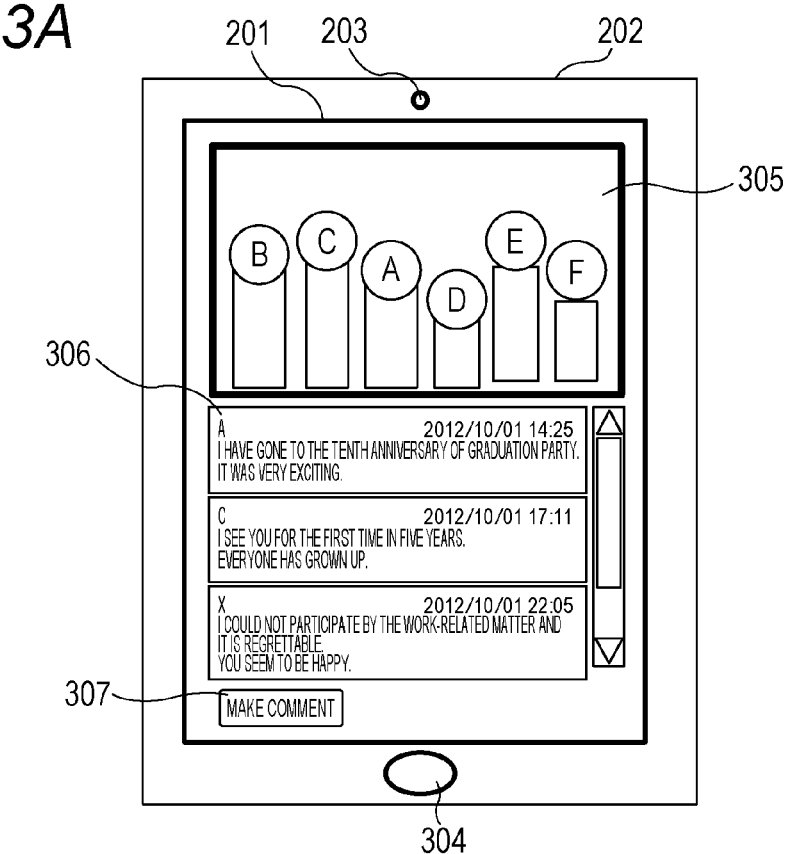
FIGS. 3A and 3B are diagrams illustrating an example of a content appreciation screen according to an embodiment of the present invention.

In the content appreciation screen in FIG. 3A, still image data is displayed on a content displaying area 305, and a plurality of items of comment data stored in association with the still image data are list-displayed on a comment display area 306. FIG. 3A illustrates the content appreciation screen in a state where a comment input mode is not activated. In a case where the viewing user requests to input a comment on still image data being displayed on the content displaying area 305, it is possible to activate the comment input mode by performing a selection operation of a comment input button 307.

Figure 3B:
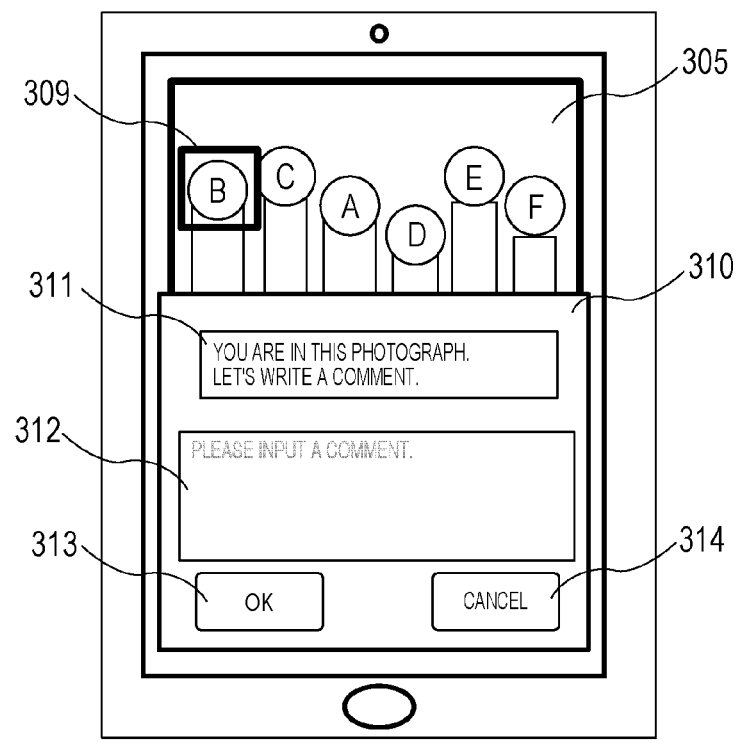

FIG. 3B illustrates the content appreciation screen in a state where the comment input mode is activated, and a comment input panel 310 in which a comment input area 312 is arranged is displayed. A character string is input as comment data in response to the viewing user's input operation and displayed on the comment input area 312. The viewing user performs a selection operation of an execution button 313 when completing the comment input operation, and, in response to this, the viewing user terminal 102 transmits the comment data to the content management apparatus 101. The content management apparatus 101 stores the transmitted comment data in association with the still image data being displayed on the content displaying area 305. Therefore, when the still image data is displayed, the input comment data is also displayed together.

Moreover, in the content appreciation screen in FIG. 3B, in a case where the face of the viewing user is included as an object of still image data displayed on the content displaying area 305, a message 311 to notify that information to the viewing user is displayed on the comment input panel 310. Moreover, a face frame 309 is superimposed and displayed on the area of the face of the viewing user on the still image data. Therefore, since the viewing user can easily confirm where the viewing user exists on the still image data and how the viewing user appears, it becomes easy to input a comment on the still image data.

In a case where the viewing user requests an input cancellation of comment, it is possible to end the comment input mode by performing a selection operation of a cancel button 314. When the comment input mode ends, it returns to the display of the content appreciation screen in FIG. 3A.

Figure 4:
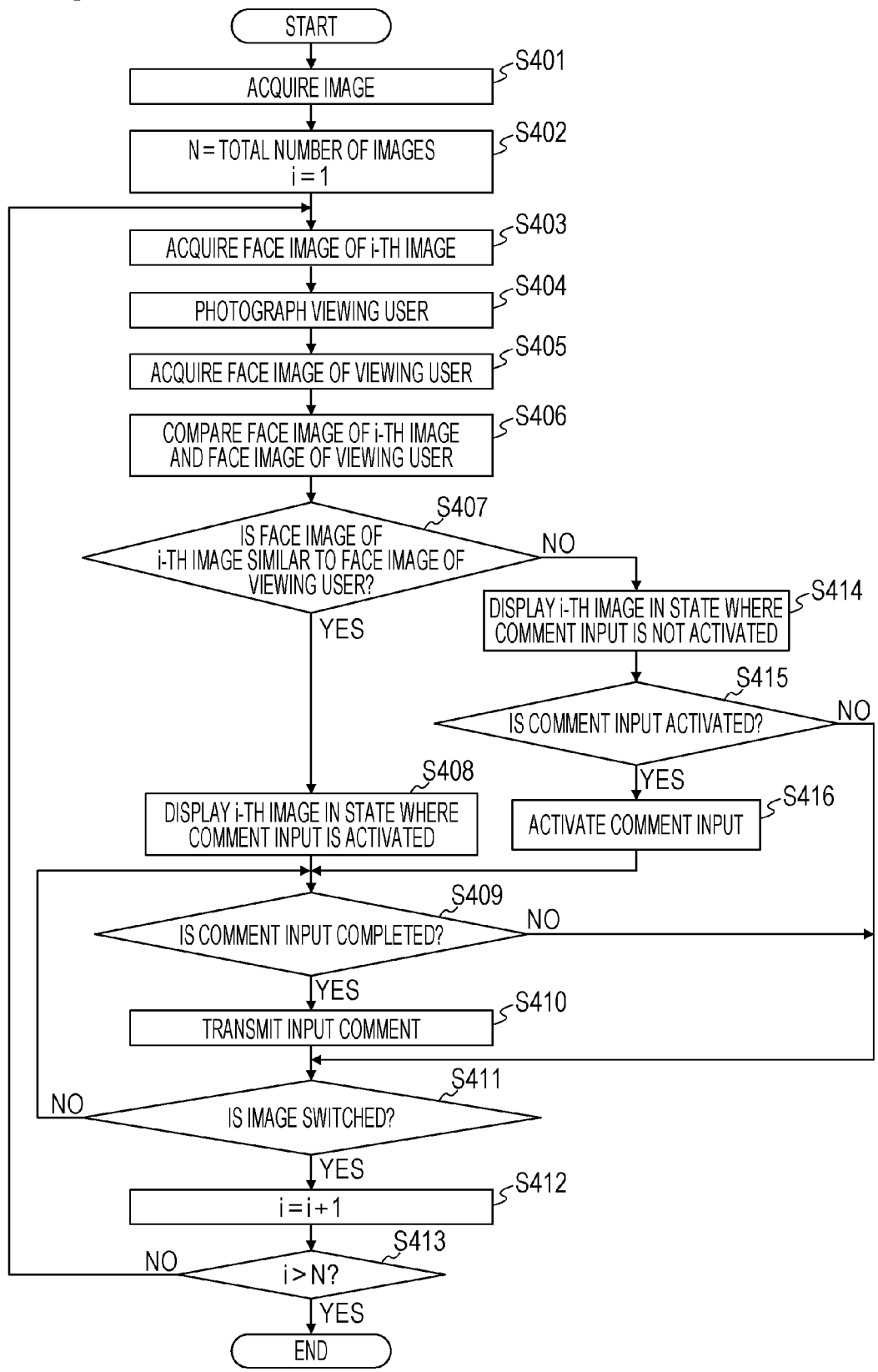
FIG. 4 is a flowchart diagram illustrating one operation example of a viewing user terminal according to an embodiment of the present invention.

The operation of the viewing user terminal 102 in the present embodiment is described with reference to FIG. 4. The operation described below is implemented by the control unit 206 of the viewing user terminal 102 by reading out various programs and data from the storage apparatus 209, the ROM 207 and the RAM 208 and controlling each device.

First, the control unit 206 acquires still image data to be displayed from the content management apparatus 101 (S401), assigns the total number of still image data to variable N and assigns initial value "1" to variable i (S402). In step S401, the control unit 206 acquires comment data stored in association with the still image data, together with the still image data.

The control unit 206 performs face recognition processing on the i-th still image data and acquires a face image (S403). The control unit 206 photographs the viewing user by the imaging apparatus 203 to capture photographed image data (S404), and performs face recognition processing to acquire the face image of the viewing user (S405). The control unit 206 compares the face image included in the i-th still image data and the face image of the viewing user (S406) and determines whether they are similar (S407). For example, the control unit 206 calculates the feature amounts from the face images and compares the feature amount of the face image included in the i-th still image data and the feature amount of the face image of the viewing user (S406). As a result of the comparison, it is determined that they are similar when the difference between the feature amounts is less than a threshold ("Yes" in S407), and it is determined that they are not similar when it is greater than the threshold ("No" in S407).

When the face image of the i-th still image data and the face image of the viewing user are similar ("Yes" in S407), the control unit 206 displays the i-th still image data on the content displaying area 305 of the content appreciation screen in a state where the comment input mode is activated as illustrated in FIG. 3B (S408).

The control unit 206 determines whether the comment input completion is instructed, in response to the viewing user's operation (S409). When detecting that the execution button 313 is selected and operated, the control unit 206 determines that the comment input completion is instructed.

If it is determined that the comment input completion is directed ("Yes" in S409), the control unit 206 transmits the input character string as comment data to the content management apparatus 101 together with the image ID that uniquely specifies the currently displayed still image data (S410). The content management apparatus 101 receives and stores the comment data in association with the image ID.

If it is determined that the display of the content displaying area 305 is switched to the next still image data in response to the viewing user's operation ("Yes" in S411), the control unit 206 adds "1" to variable i (S412). Further, if variable i is less than variable N ("No" in S413), similar processing is performed on the i-th still image data.

On the other hand, if the face image of the i-th still image data and the face image of the viewing user are not similar ("No" in S407), the control unit 206 displays the i-th still image data on the content displaying area 305 without activating the comment input mode as illustrated in FIG. 3A (S414). Afterward, if an activation instruction of the comment input mode by the viewing user is accepted ("Yes" S415), the control unit 206 activates the comment input mode and displays the comment input panel 310 as illustrated in FIG. 3B (S416).

As described above, according to the present embodiment, if the viewing user appears in an image, since the comment input mode is activated and the comment input area is automatically displayed together with the image, it is possible to prevent the viewing user from failing to input a comment on the image in which the viewing user appears. Moreover, it is possible to encourage a person in the image to positively input a comment without trouble for the provider of the image. Moreover, if the viewing user does not appear in the image, since the comment input mode is not automatically activated, the viewing user can easily recognize that it is an image that does not especially require the input.

Here, although the viewing user is photographed in step S404 to acquire the face image of the viewing user from a photographed image as above, it is not limited to this. For example, other external apparatuses than the viewing user terminal 102 may hold the face image of the viewing user beforehand.

Figure 5:
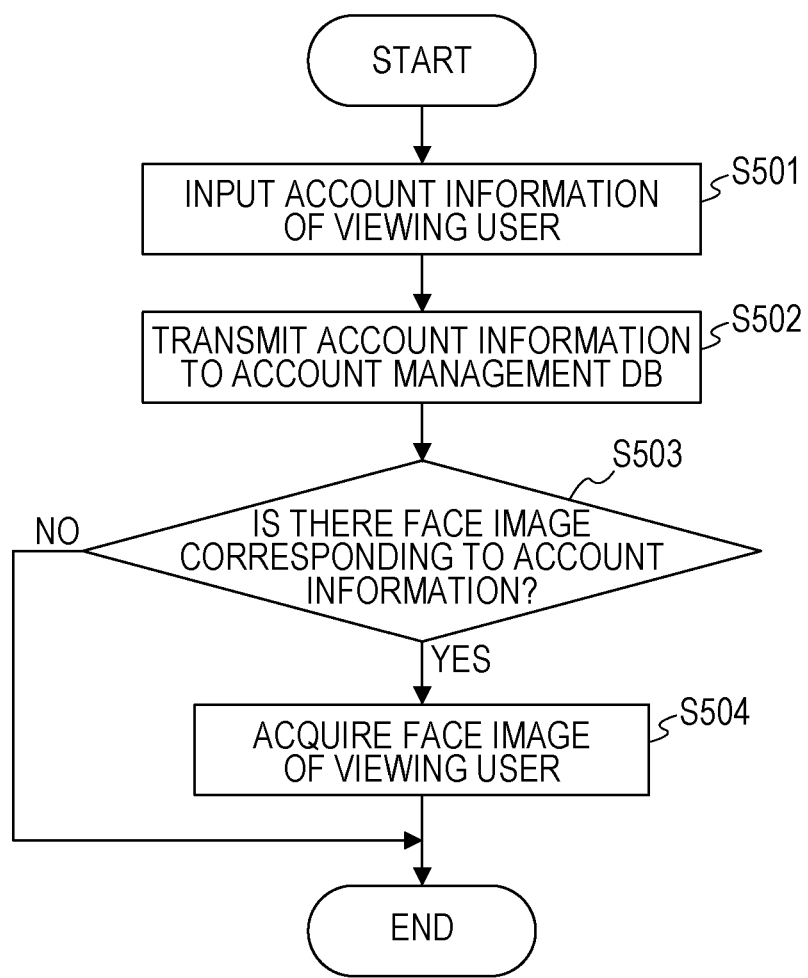
FIG. 5 is a flowchart diagram illustrating one operation example of a viewing user terminal according to an embodiment of the present invention.

Operation in a case where the viewing user terminal 102 acquires the face image of the viewing user without photographing the viewing user is described with reference to FIG. 5.

The control unit 206 acquires account information of the viewing user in response to an input operation of the viewing user (S501) and transmits the account information to a server apparatus of an account management DB through the network 103 (S502). The server apparatus of the account management DB stores account information in association with face images of the viewing users, retrieves the face image associated with the account information received from the viewing user terminal 102, and notifies whether there is the corresponding face image to the viewing user terminal 102. If it is determined based on the notification from the server apparatus of the account management DB that there is the face image corresponding to the account information ("Yes" in S503), the control unit 206 requests the face image to the server apparatus of the account management DB and receives it through the network 103 (S504).

Here, the account information includes the user ID that uniquely specifies the viewing user. It may include a password in addition to the user ID.

Moreover, the viewing user terminal 102 may have an input device to input biological information such as the fingerprint, the voiceprint, the iris pattern and the vein pattern, and use the biological information of the viewing user as account information.

Figure 6:
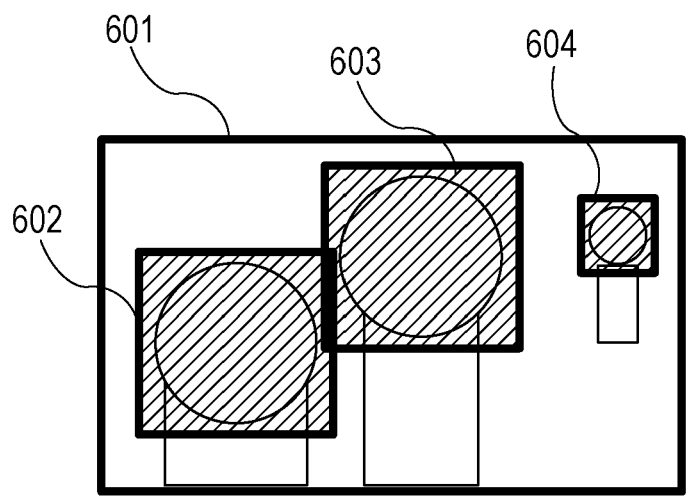
FIG. 6 is a diagram illustrating one example of still image data according to an embodiment of the present invention.

Moreover, although a case has been described where the comment input area is automatically displayed at any time if the face image included in the still image data in step S403 is similar, it is not limited to this. For example, a face image in which the area rate (area ratio) of the similar face image to the entire still image data is small may not be acquired. For example, when a face image 602 or 603 is similar to the face image of the viewing user in FIG. 6, each percentage of the whole of the still image data 601 is large and therefore the comment input area is automatically displayed in step S408. On the other hand, when a face image 604 is similar to the face image of the viewing user, the percentage of the entire still image data is small and therefore the comment input area is non-displayed in step S414 without automatically displaying the comment input area.

Figure 7:
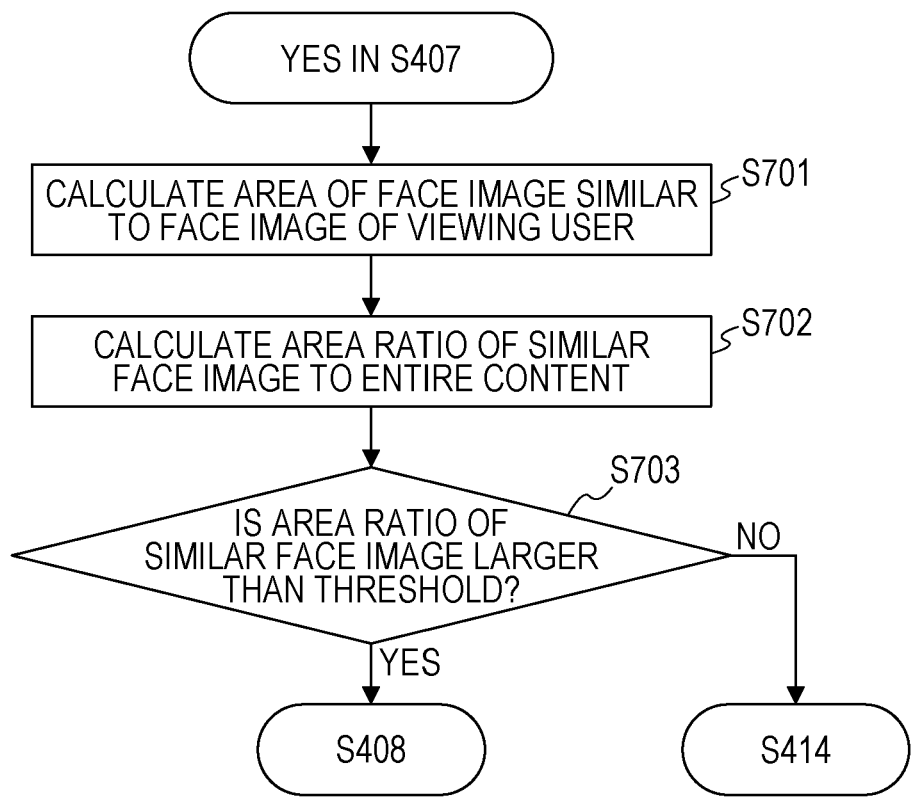
FIG. 7 is a flowchart diagram illustrating one operation example of a viewing user terminal according to an embodiment of the present invention.

Operation in a case where the viewing user terminal 102 automatically activates the comment input area according to whether a similar face image included in still image data satisfies a predetermined condition is described with reference to FIG. 7.

If it is determined that the face image of the i-th image and the face image of the viewing user are similar ("Yes" in S407), the control unit 206 calculates the area of the face image similar to the face image of the viewing user in the still image data (S701) and calculates the rate (area ratio) of it to the entire still image data (S702). If the face image area ratio is larger than a threshold ("Yes" in S703), it proceeds to step S408. On the other hand, if the face image area ratio is smaller than the threshold ("No" in S703), it proceeds to step S414.

As described above, since it is not easy to perform a visual check even if an image is displayed when the face image area ratio is small, it is possible to determine that it is less necessary to input a comment related to the person, and it is possible to save the viewing user's trouble of inputting an unnecessary comment. Moreover, if the face image area ratio is small, the accuracy of face recognition processing decreases and there is a possibility of mis-recognizing an unrelated person who happens to pass and be photographed. Therefore, since there is a high possibility that he/she is not similar to the viewing user, it is possible to save the viewing user's trouble of being bothered with an unnecessary notification by causing the comment input area not to be automatically displayed.

Here, instead of calculating the area ratio and comparing the area ratio with a threshold, the area of a similar face image in still image data is compared with a threshold without calculating the area ratio, and, if it is greater than the threshold, it may proceed to step S408.

Moreover, if it is determined that the face image of the i-th still image data and the face image of the viewing user are similar ("Yes" in S407), the control unit 206 counts the number of face images extracted from the still image data, and, when it is fewer than a predetermined number, it may proceed to step S408. Therefore, in a case where there are few persons with a high possibility of inputting a comment on the still image data except for the viewing user, it is possible to encourage the viewing user to input a comment and it is possible to prevent a comment on the still image data from not being input.

Moreover, if it is determined that the face image of the i-th still image data and the face image of the viewing user are similar ("Yes" in S407), the control unit 206 may make it proceed to step S408 when the area of the face image similar to the face image of the viewing user is the largest among face images included in the still image data. Therefore, it is possible to encourage a person who is remarkable in the still image data to positively input a comment.

Moreover, a case has been described above about a display mode in which the comment input area is automatically displayed if a similar face image to the viewing user is included in displayed content, and, otherwise, the comment input area is non-displayed. However, it is not limited to this, and other display modes are possible as long as they encourage the viewing user to input a comment. For example, the comment input area is displayed regardless of whether a similar face image to the viewing user is included in displayed content, and, when content including the similar face image to the viewing user is displayed, the comment input area is blinked or a frame is assigned for highlighting. Alternatively, as compared with when content that does not include the similar face image to the viewing user is displayed, the comment input area is expanded and displayed in a remarkable position such as the center. Alternatively, the color of the comment input area may be changed depending on whether the displayed content includes the similar face image to the viewing user. By these means, the viewing user becomes likely to notice that content including a face image similar to the viewing user is displayed and the viewing user should input a comment, and it is possible to prevent a comment from failing to be input.

Moreover, although a case has been described above where comment data on content is input, it is possible to implement the present embodiment in the same way even in a case where another additional information is input instead of the comment data. Examples thereof include rating data indicating the rank of evaluation related to content or publication range data indicating the other parties to whom the publication of the content is permitted, and so on. Therefore, it is possible to encourage the input even with respect to additional information for which the viewing user is requested to make a determination, except for the comment data.

Second Embodiment

In the present embodiment, a case is described where the content management apparatus 101 provides moving image data to the viewing user terminal 102 as content and displays the moving image data on the display apparatus 201 of the viewing user terminal 102. Here, the explanation is omitted about the similar configuration to the first embodiment described above.

Figure 8A:
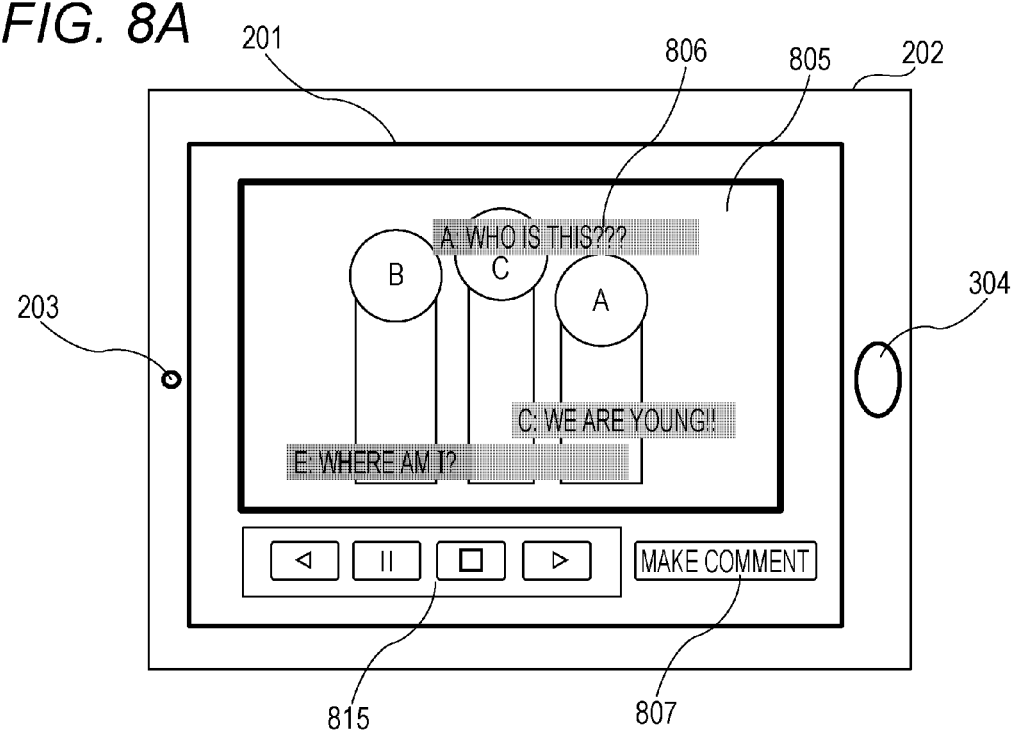
FIGS. 8A and 8B are diagrams illustrating an example of a content appreciation screen according to an embodiment of the present invention.

FIG. 8 is a diagram illustrating one example of a content appreciation screen of the present embodiment. In the content appreciation screen in FIG. 8A, moving image data is displayed on a content displaying area 805 and a plurality of items of comment data 806 stored in association with a frame of the moving image data are also superimposed and displayed on the content displaying area 805. A playback controller 816 is designed to input instructions such as the fast-forwarding play, the rewind, the pause and the stop for the playback of the moving image data. FIG. 8A illustrates the content appreciation screen in a state where the comment input mode is not activated. In the case of requesting to input a comment on the moving image data played back in the content displaying area 805, the viewing user can activate the comment input mode by performing a selection operation of a comment input button 807.

Figure 8B:
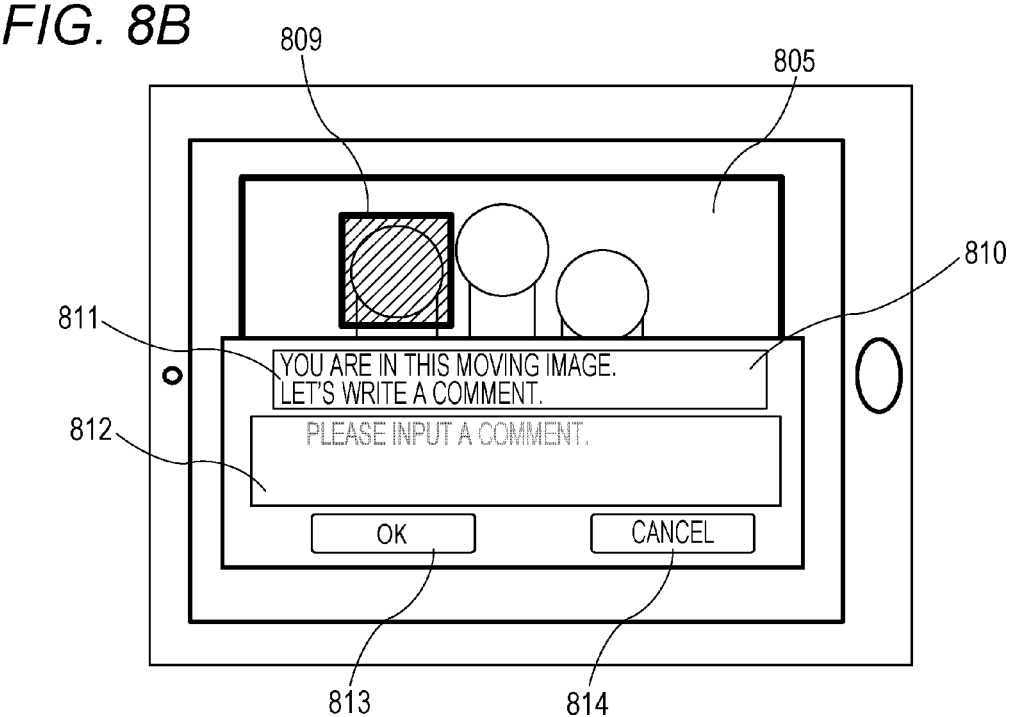

FIG. 8B illustrates the content appreciation screen in a state where the comment input mode is activated, and a comment input panel 810 in which a comment input area 812 is arranged is displayed. A character string is input as comment data in response to an input operation of the viewing user and displayed on the comment input area 812. When completing the input operation of the comment, the viewing user performs a selection operation of an execution button 813, and, in response to this, the viewing user terminal 102 transmits the comment data to the content management apparatus 101. The content management apparatus 101 stores the transmitted comment data in association with a frame of the moving image data. Therefore, when the moving image data is played back, the input comment data is displayed together. In the present embodiment, the playback of the moving image data is paused for the input of comment data, and the comment data is continuously displayed for a certain period of time from the paused position.

Moreover, in the content appreciation screen in FIG. 8B, in a case where the face of viewing user is included as an object in a frame of the played back moving image data, a message 811 to notify that information to the viewing user is displayed on the comment input panel 810. Moreover, a face frame 809 is superimposed and displayed on the area of the face of the viewing user on the moving image data. Therefore, since the viewing user can easily confirm where the viewing user exists on the moving image data and how the viewing user appears, it becomes easy to input a comment on the moving image data.

In a case where the viewing user requests an input cancellation of comment, it is possible to end the comment input mode by performing a selection operation of a cancel button 814. When the comment input mode ends, it returns to the display of the content appreciation screen in FIG. 8A.

Figure 9:
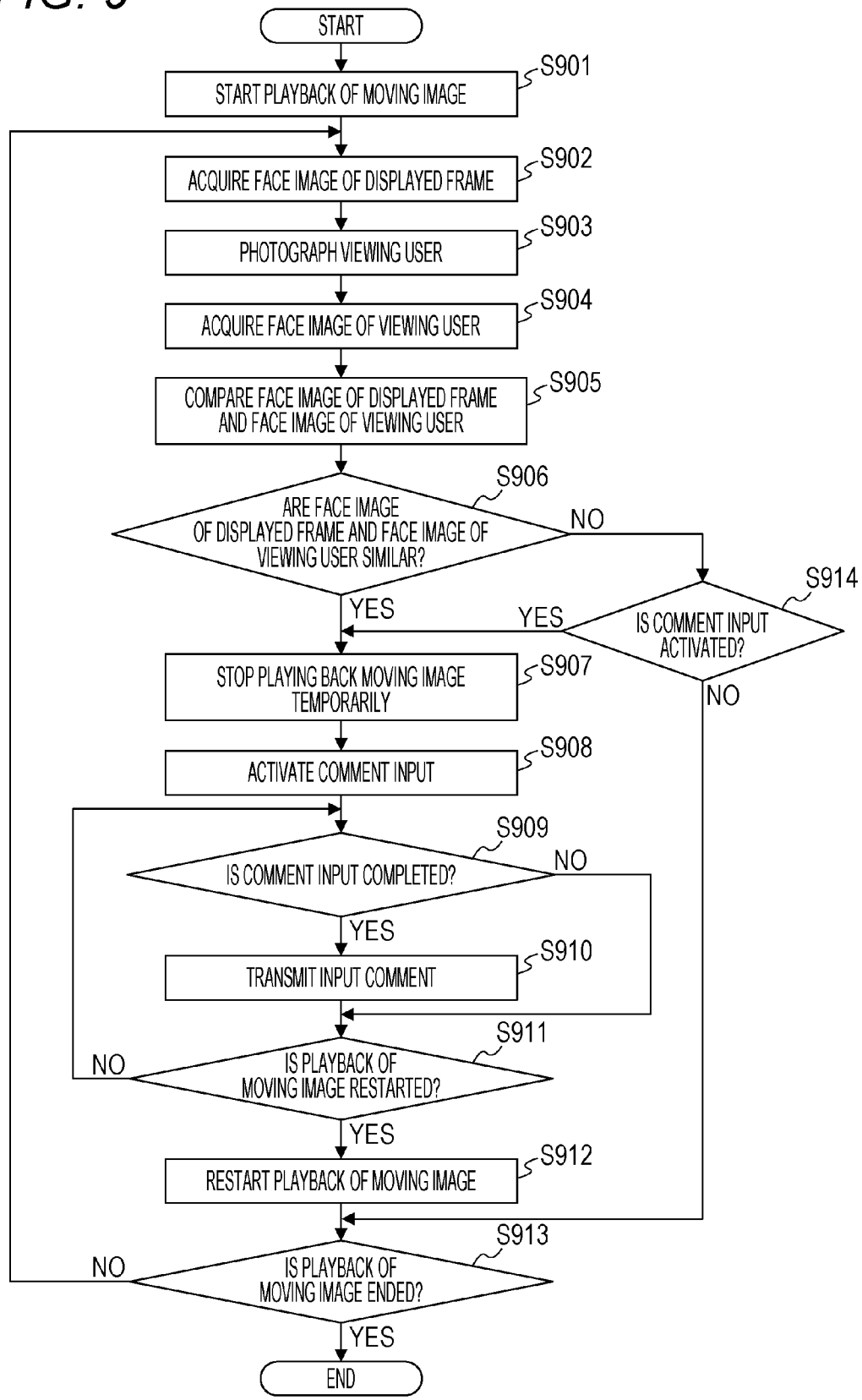
FIG. 9 is a flowchart diagram illustrating one operation example of a viewing user terminal according to an embodiment of the present invention.

The operation of the viewing user terminal 102 in the present embodiment is described with reference to FIG. 9. The operation described below is implemented by the control unit 206 of the viewing user terminal 102 by reading out various programs and data from the storage apparatus 209, the ROM 207 and the RAM 208 and controlling each device.

First, the control unit 206 displays the appreciation screen in a state where the comment input mode is not activated as illustrated in FIG. 8A, acquires moving image data to be played back from the content management apparatus 101 and starts playing it back (S901). In step S901, the control unit 206 acquires comment data stored in association with each frame of the moving image data, together with the moving image data.

The control unit 206 performs face recognition processing on the image in a displayed frame and acquires a face image (S902). The control unit 206 photographs the viewing user by the imaging apparatus 203 to capture photographed image data (S903), and performs face recognition processing to acquire the face image of the viewing user (S904). The control unit 206 compares the face image included in the displayed frame and the face image of the viewing user (S905) and determines whether they are similar (S906). If the face image included in the displayed frame and the face image of the viewing user are similar ("Yes" in S906), the control unit 206 stops playing back the moving image data temporarily (S907), activates the comment input mode (S908) and displays the comment input panel 810 on the content appreciation screen.

The control unit 206 determines whether the input completion of comment is instructed, in response to the viewing user's operation (S909). If it is determined that the comment input completion is instructed ("Yes" in S909), the control unit 206 transmits an input character string as comment data to the content management apparatus 101 together with the image ID of the moving image data and information that specifies the frame position (S910). The content management apparatus 101 receives and stores the comment data in association with the image ID and the paused position.

Further, if an instruction to restart the playback of the paused moving image data is input ("Yes" in S911), the playback of the moving image data is restarted. And, if an instruction to end the playback of the paused moving image data is not input ("No" in S913), the control unit 206 performs above-mentioned processing on the frame to be played back next.

On the other hand, if the face image included in the displayed frame and the face image of the viewing user are not similar ("No" in S906), the control unit 206 determines whether an activation instruction of the comment input mode by the viewing user is accepted (S914). Further, if there is the activation instruction ("Yes" in S914), the control unit 206 stops playing back the moving image data temporarily (S907), activates the comment input mode (S908) and displays the comment input panel 810 on the content appreciation screen.

As described above, according to the present embodiment, even in the case of the playback of moving image data, similar to the case of the playback of still image data, if the viewing user is in the image, it is possible to activate the comment input mode and automatically display a comment input area.

Here, when it is determined in step S906 that the face image included in the displayed frame and the face image of the viewing user are similar, the control unit 206 continuously performs face recognition processing on frames until the elapse of a certain period of time and acquisition processing of face images included in the frames afterward. Further, if a face image similar to the face image of the viewing user continuously exits in the frames during the certain period of time, it may proceed to the processing in step S907 and subsequent steps.

Figure 10A:
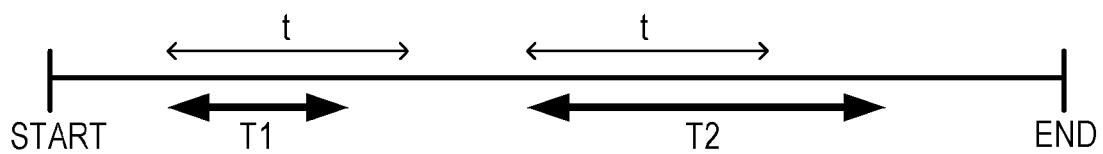
FIGS. 10A and 10B are diagrams illustrating an example of a playback sequence of moving image data according to an embodiment of the present invention.

For example, FIG. 10A is a sequence diagram illustrating a case where the face image of the viewing user exists in an interval of T1 of the moving image data but disappears before the lapse of predetermined time t. In such a case, the control unit 206 cannot determine in step S906 that the face image included in the displayed frame and the face image of the viewing user are similar. Therefore, the control unit 206 does not activate the comment input mode. On the other hand, if the face image of the viewing user exists in an interval of T2, it exists after the lapse of predetermined time t and therefore the control unit 206 determines in step S906 that the face image included in the displayed frame and the face image of the viewing user are similar. Therefore, the control unit 206 activates the comment input mode.

Therefore, it is possible to encourage a person appearing in an image for a sufficiently long time to positively input a comment.

Moreover, in a case where a face image similar to the face of the viewing user is determined to exist, the comment input mode is automatically activated and comment data is input. And the comment data or comment may be displayed while the face image similar to the face of the viewing user is displayed corresponding to payback of the moving image data.

Figure 10B:
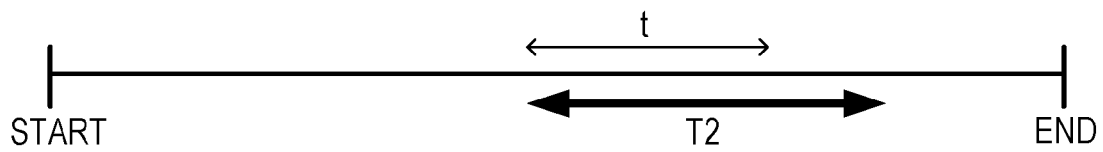

For example, FIG. 10B is a playback sequence diagram indicating a case where the face image of the viewing user exists in an interval of T2 of the moving image data. In such a case, when the moving image data is played back in a case where comment data is input at certain timing in the interval of T2, the comment data is displayed in the interval of T2.

Moreover, in the above, although a comment input area is displayed if a face image similar to the face of the viewing user exists in each frame of moving image data, it is not limited to this. For example, if there is a scene in which a face image similar to the face of the viewing user exists through the entire moving image data, the comment input area may be displayed. In this case, if the comment input area is displayed after the face image similar to the face of the viewing user is displayed or after the moving image data is played back to the last, the viewing user can input a suitable comment after confirming in which scene the viewing user appears. Moreover, in a case where playback time of the face image similar to the face of the viewing user appears is longer than a predetermined time, the comment input area may be displayed.

Moreover, although a case has been described above about moving image data, the present embodiment is similarly applicable to slide show that automatically switches and displays a series of items of still image data sequentially at predetermined time intervals. Alternatively, the present embodiment is similarly applicable to scroll displaying that scrolls and sequentially displays a plurality of items of still image data in response to a quick input operation such as a flick input of the viewing user. Alternatively, the present embodiment is similarly applicable to preview displaying that automatically switches and displays a plurality of pages of a photo book described later. To be more specific, a face image of displayed still image data is acquired (S902) and is compared with the face image of the viewing user (S905). Further, if the displayed face is similar to the face of the viewing user ("Yes" in S906), the slide show, the scroll displaying or the preview may be paused (S907) and the comment input may be activated for still image data or page displayed during the pause (S908). Therefore, if the displayed face is similar to the face of the viewing user, the viewing user can input a comment, and, if the displayed face is not similar to the face of the viewing user, the control unit 206 continues to display next image and therefore the viewing user can quickly view another image without inputting a comment.

Third Embodiment

In the present embodiment, a case is described where the content management apparatus 101 provides a photo book to the viewing user terminal 102 as content and sequentially switches and displays the pages of the photo book on the display apparatus 201 of the viewing user terminal 102. A plurality of items of still image data are arranged in the pages of the photo book. Here, the explanation is omitted about the components similar to the first and second embodiments described above.

Figure 11A:
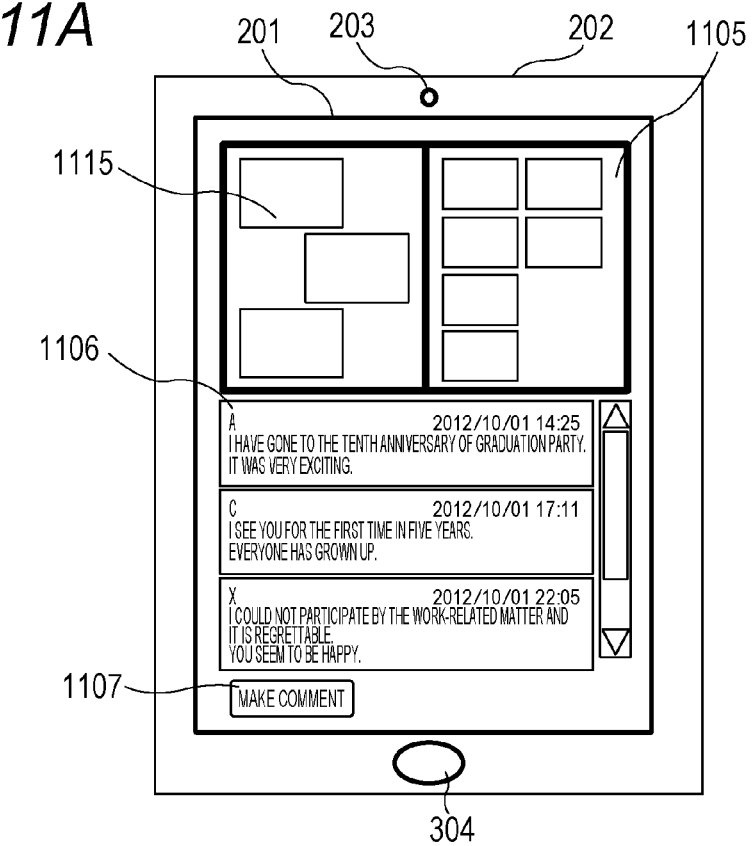
FIGS. 11A and 11B are diagrams illustrating an example of a content appreciation screen according to an embodiment of the present invention.

FIG. 11 is a diagram illustrating one example of a content appreciation screen of the present embodiment. In the content appreciation screen in FIG. 11A, a page in which a plurality of items of still image data 1115 are arranged is displayed on a content displaying area 1105, and a plurality of items of comment data stored in association with the currently displayed page are list-displayed on a comment display area 1106. FIG. 11A illustrates the content appreciation screen in a state where the comment input mode is not activated. In the case of requesting to input a comment on the page being displayed on the content displaying area 1105, the viewing user can activate the comment input mode by performing a selection operation of a comment input button 1107.

Figure 11B:
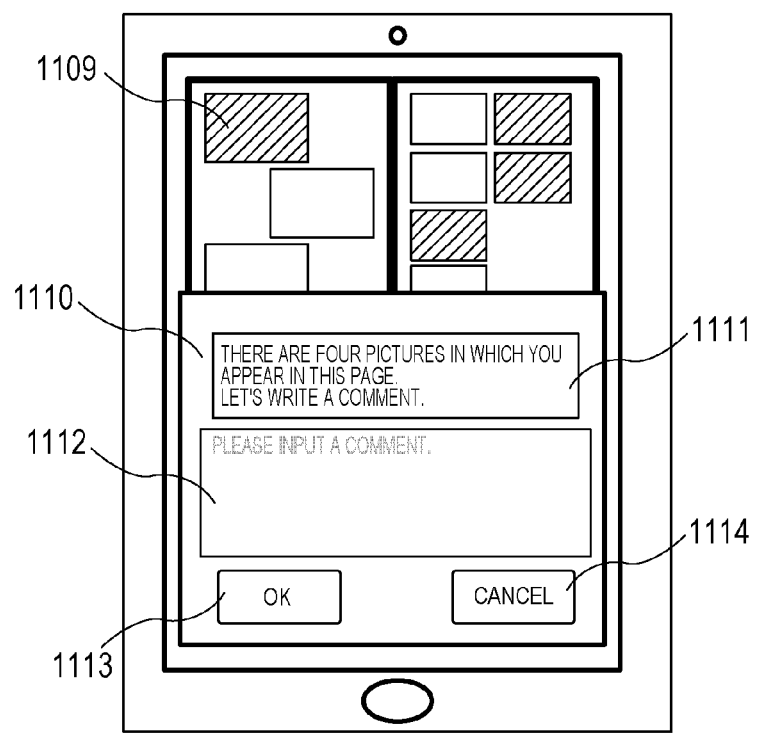

FIG. 11B illustrates the content appreciation screen in a state where the comment input mode is activated, and a comment input panel 1110 in which a comment input area 1112 is arranged is displayed. A character string is input as comment data in response to the input operation of the viewing user and displayed on the comment input area 1112. When completing the input operation of the comment, the viewing user performs a selection operation of an execution button 1113, and, in response to this, the viewing user terminal 102 transmits the comment data to the content management apparatus 101. The content management apparatus 101 stores the transmitted comment data in association with the currently displayed page of the photo book. Therefore, when the page of the photo book is displayed, the input comment data is displayed together.

Moreover, in the content appreciation screen in FIG. 11B, a message 1111 indicating that the face of the viewing user is included as an object of still image data 1109 arranged in the page displayed on the content displaying area 1105 is displayed on the comment input panel 1110. Moreover, still image data including the face of the viewing user among the still image data arranged in the page is highlighted. FIG. 11B illustrates a display example by hatching with diagonal lines. Therefore, the viewing user can easily confirm in which still image data on the page the viewing user exists and how the viewing user appears.

In a case where the viewing user requests an input cancellation of comment, it is possible to end the comment input mode by performing a selection operation of a cancel button 1114. When the comment input mode ends, it returns to the display of the content appreciation screen in FIG. 11A.

Figure 12:
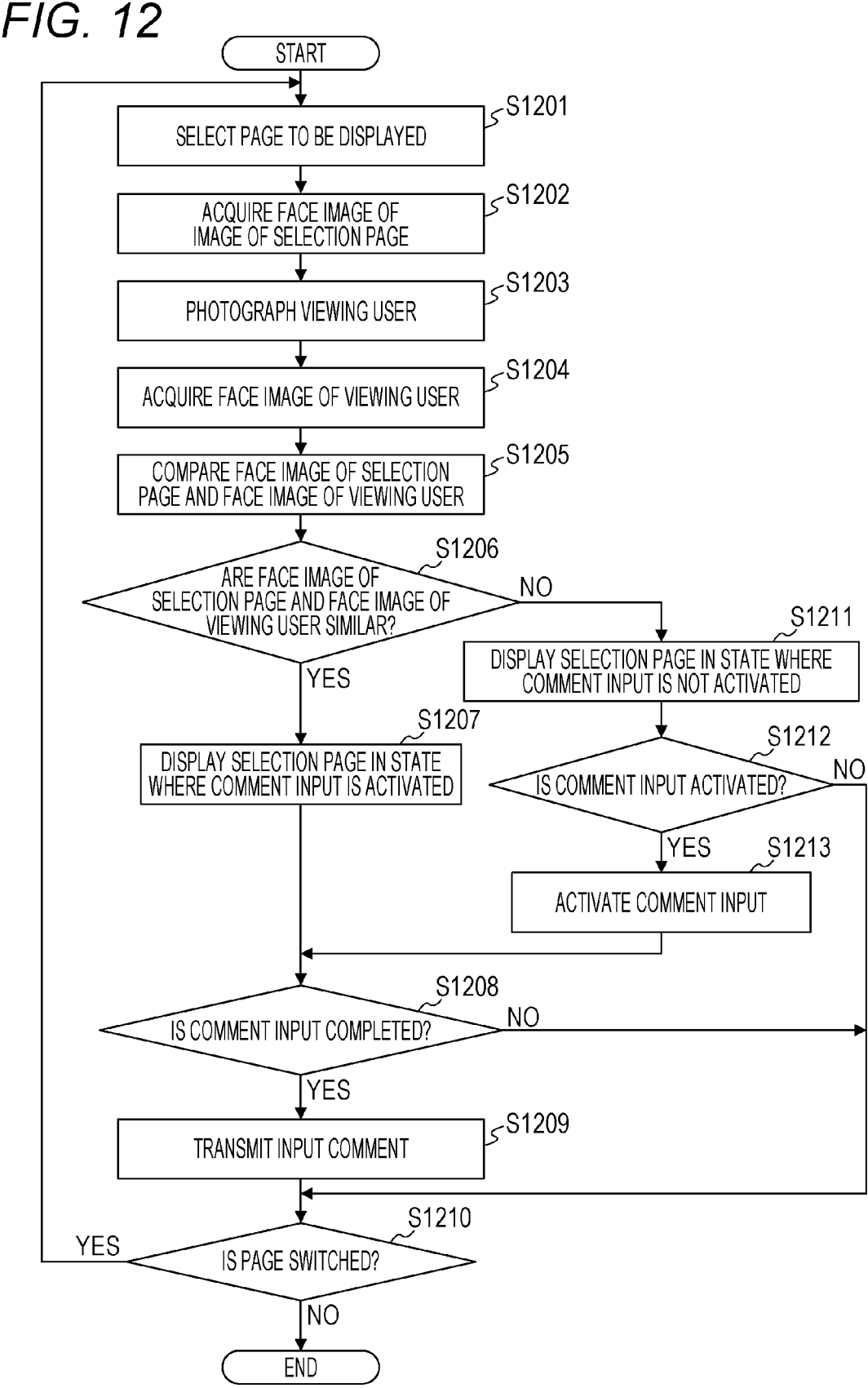
FIG. 12 is a flowchart diagram illustrating one operation example of a viewing user terminal according to an embodiment of the present invention.

The operation of the viewing user terminal 102 in the present embodiment is described with reference to FIG. 12. The operation described below is implemented by the control unit 206 of the viewing user terminal 102 by reading out various programs and data from the storage apparatus 209, the ROM 207 and the RAM 208 and controlling each device.

First, the control unit 206 acquires photo book data from the content management apparatus 101. The photo book data describes the image ID of image data of the arrangement target and the arrangement position in association with each other in each page. Further, the photo book data includes still image data arranged in the page and comment data associated with the page.

First, the control unit 206 selects a page to be displayed (S1201). The page is selected in response to a designation operation of the viewing user. Alternatively, the first page may be automatically selected first.

The control unit 206 performs face recognition processing on still image data arranged in the selected page and acquires a face image (S1202). The control unit 206 photographs the viewing user by the imaging apparatus 203 to capture photographed image data (S1203) and acquires the face image of the viewing user (S1204). The control unit 206 compares the face image included in the still image data of the selected page and the face image of the viewing user (S1205) and determines whether they are similar (S1206).

If the face image of the still image data of the selection page and the face image of the viewing user are similar ("Yes" in S1206), the control unit 206 activates the comment input mode as illustrated in FIG. 11B and displays the selection page on the content displaying area 1105 of the content appreciation screen (S1207).

In response to the viewing user's operation, the control unit 206 determines whether the input completion of comment is instructed (S1208).

If it is determined that the input completion of comment is instructed ("Yes" in S1208), the control unit 206 transmits an input character string to the content management apparatus 101 as the comment data (S1209). In step S1209, the control unit 206 also transmits the photo book ID that uniquely specifies photo book data and the page ID that uniquely specifies a page to the content management apparatus 101. The content management apparatus 101 receives and stores the comment data in association with the photo book ID and the page ID.

If it is determined that the display of the content displaying area 1105 is switched to the next page in response to the viewing user's operation ("Yes" in S1210), the control unit 206 performs similar processing on the next page.

On the other hand, if the face image of the still image data of the selection page and the face image of the viewing user are not similar ("No" in S1206), the control unit 206 displays the selection page on the content displaying area 1105 without activating the comment input mode as illustrated in FIG. 11A (S1211). Afterward, if an activation instruction of the comment input mode by the viewing user is accepted ("Yes" in S1212), the control unit 206 activates the comment input mode and displays the comment input panel 1110 as illustrated in FIG. 11B (S1213).

As described above, according to the present embodiment, even in the case of the preview of a page of a photo book, similar to the case of the playing of still image data, if the face of the viewing user appears in an image arranged on the page, it is possible to activate the comment input mode and automatically display the comment input area.

Here, a case has been described above where, if there is still image data including the face image of the viewing user on a page, regardless of the number of still image data, the content appreciation screen is displayed in a state in which the comment input mode is automatically activated in step S1207. However, it is not limited to this, and, for example, if the ratio of the number of still image data including the face image of the viewing user to the total number of still image data displayed on the page is larger than a predetermined value, the comment input mode may be automatically activated.

Moreover, if the number of still image data including the face image of the viewing user is larger than a predetermined number, the comment input mode may be automatically activated (S1207), and, if it is smaller than the predetermined number, the comment input mode may not be activated (S1208).

Moreover, the control unit 206 calculates the area of still image data including the face image of the viewing user and calculates the ratio of it to the area of the entire page. Moreover, if it is larger than a predetermined value, the comment input mode may be automatically activated (S1207), and, if it is smaller than the predetermined value, the comment input mode may not be activated (S1208).

Moreover, if the area of still image data including the face image of the viewing user is larger than a predetermined value, the comment input mode may be automatically activated (S1207), and, if it is smaller than the predetermined value, the comment input mode may not be activated (S1208).

Here, in the first to third embodiments described above, although a case has been described where the viewing user terminal 102 performs face recognition processing on content and acquires a face image, the content management apparatus 101 may perform them instead of the viewing user terminal 102 and transmit the face image to the viewing user terminal 102.

Further, in the first to third embodiments described above, a case has been described where the viewing user terminal 102 compares a face image in content and the face image of the viewing user and determines whether they are similar. However, the content management apparatus 101 may acquire the face image of the viewing user from the viewing user terminal 102 or the like and perform the similarity determination instead of the viewing user terminal 102.

Further, the content management apparatus 101 may instruct the activation of the comment input mode to the viewing user terminal 102, and according to this instruction, the viewing user terminal 102 may display a content input panel on the content appreciation screen.

Here, similar to the viewing user terminal 102, the content management apparatus 101 is implemented by an information processing apparatus having the configuration illustrated in FIG. 2.

Other Embodiments

Embodiments of the present invention can also be implemented by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-094252, filed Apr. 26, 2013, which is hereby incorporated by reference herein in its entirety.

What is claimed is:

1. An information processing apparatus comprising:
    a first generating unit configured to generate a first image to display content on a display apparatus;
    a second generating unit configured to generate a second image to display an input area to input additional information with respect to the content in a different display mode according to whether a first face image and a second face image are similar on the display apparatus when the second face image similar to the first face image satisfies a predetermined condition;
    a first acquisition unit configured to acquire the first face image included in photographed image data captured by photographing a viewing user of the content;
    a second acquisition unit configured to acquire the second face images included in the content; and
    a control display unit configured to control the display apparatus to display the input area when the first face image and the second face image are similar, and does not control the display apparatus to display the input area when the first face image and the second face image are not similar,
    wherein the content is the moving-image data, and
    when the second face image similar to the first face image exists longer than a predetermined time, the second generating unit generates the second image to display the input area.

2. The information processing apparatus according to claim 1, wherein, when an area of the second face image similar to the first face image is the most similar among the second face images acquired by the second acquisition unit, the second generating unit generates the second image to display the input area.

3. The information processing apparatus according to claim 1, wherein the second generating unit automatically generates the second image data to display the input area when the first face image and the second face image are similar, and displays the input area in response to an operation of the viewing user when the first face image and the second face image are not similar.

4. The information processing apparatus according to claim 1, wherein, when the first face image and the second face image are similar, the second generating unit generates the second image data to display the input area as compared with when the first face image and the second face image are not similar.

5. The information processing apparatus according to claim 1, wherein, when the first face image and the second face image are similar, the second generating unit generates the second image data to display the input area in a different color from when the first face image and the second face image are not similar.

6. The information processing apparatus according to claim 1, wherein, when the first face image and the second face image are similar, the second generating unit generates the second image data to display the input area at a different position from when the first face image and the second face image are not similar.

7. The information processing apparatus according to claim 1, wherein, when the first face image and the second face image are similar, the second generating unit generates the second image data to blink or display the input area or assign a frame to the input area.

8. The information processing apparatus according to claim 1, wherein the additional information is data indicating at least one of a comment on the content, rating of the content and a publication range of the content.

9. The information processing apparatus according to claim 1
    further comprising a stop unit configured to stop playing back contemporarily the moving-image data, when the first face image and the second face image are similar.

10. An information processing apparatus comprising:
    a first generating unit configured to generate a first image to display content on a display apparatus;
    a second generating unit configured to generate a second image to display an input area to input additional information with respect to the content in a different display mode according to whether a first face image and a second face image are similar on the display apparatus when the second face image similar to the first face image satisfies a predetermined condition;
    a first acquisition unit configured to acquire the first face image included in photographed image data captured by photographing a viewing user of the content; and
    a second acquisition unit configured to acquire the second face images included in the content; and
    a control display unit configured to control the display apparatus to display the input area when the first face image and the second face image are similar, and does not control the display apparatus to display the input area when the first face image and the second face image are not similar, wherein the content includes a plurality of items of still image data arranged in a page, and when a ratio of the number of still image data in which the second face image similar to the first face image exists to the total number of still image data in the page is larger than a predetermined value or when the number of still image data in which the second face image similar to the first face image exists is larger than a predetermined value, the second generating unit generates the second image to display the input area.

11. An information processing apparatus comprising:
a first generating unit configured to generate a first image to display content on a display apparatus;
a second generating unit configured to generate a second image to display an input area to input additional information with respect to the content in a different display mode according to whether a first face image and a second face image are similar on the display apparatus;
a first acquisition unit configured to acquire the first face image included in photographed image data captured by photographing a viewing user of the content;
a second acquisition unit configured to acquire the second face images included in the content;
a control display unit configured to control the display apparatus to display the input area when the first face image and the second face image are similar, and does not control the display apparatus to display the input area when the first face image and the second face image are not similar; and
a count unit configured to count the number of the second face images acquired by the second acquisition unit,
wherein when the number of the second face images is smaller than a predetermined number, the second generating unit generates the second image to display the input area.

12. A control method of an information processing apparatus, comprising the steps of:
generating a first image to display content on a display apparatus;
generating a second image to display an input area to input additional information with respect to the content in a different display mode according to whether a first face image and a second face image are similar on the display apparatus when the second face image similar to the first face image satisfies a predetermined condition;
acquiring the first face image included in photographed image data captured by photographing a viewing user of the content;
acquiring the second face images included in the content; and
controlling the display apparatus to display the input area when the first face image and the second face image are similar, and not controlling the display apparatus to display the input area when the first face image and the second face image are not similar,
wherein the content is the moving-image data, and
when the second face image similar to the first face image exists longer than a predetermined time, the second generating unit generates the second image to display the input area.

13. A non-transitory storage medium storing a computer-readable program to cause a computer to execute the program which executes the following steps of:
generating a first image to display content on a display apparatus;
generating a second image to display an input area to input additional information with respect to the content in a different display mode according to whether a first face image and a second face image are similar on the display apparatus when the second face image similar to the first face image satisfies a predetermined condition;
acquiring the first face image included in photographed image data captured by photographing a viewing user of the content;
acquiring the second face images included in the content; and
controlling the display apparatus to display the input area when the first face image and the second face image are similar, and does not control the display apparatus to display the input area when the first face image and the second face image are not similar,
wherein the content is the moving-image data, and
when the second face image similar to the first face image exists longer than a predetermined time, the second generating unit generates the second image to display the input area.

14. A control method of an information processing apparatus, comprising the steps of:
generating a first image to display content on a display apparatus;
generating a second image to display an input area to input additional information with respect to the content in a different display mode according to whether a first face image and a second face image are similar on the display apparatus when the second face image similar to the first face image satisfies a predetermined condition;
acquiring the first face image included in photographed image data captured by photographing a viewing user of the content;
acquiring the second face images included in the content; and
controlling the display apparatus to display the input area when the first face image and the second face image are similar, and does not control the display apparatus to display the input area when the first face image and the second face image are not similar,
wherein the content includes a plurality of items of still image data arranged in a page, and
when a ratio of the number of still image data in which the second face image similar to the first face image exists to the total number of still image data in the page is larger than a predetermined value or when the number of still image data in which the second face image similar to the first face image exists is larger than a predetermined value, the second image to display the input area is generated.

15. A control method of an information processing apparatus, comprising the steps of:
generating a first image to display content on a display apparatus;
generating a second image to display an input area to input additional information with respect to the content in a different display mode according to whether a first face image and a second face image are similar on the display apparatus;
acquiring the first face image included in photographed image data captured by photographing a viewing user of the content;
acquiring the second face images included in the content; and
controlling the display apparatus to display the input area when the first face image and the second face image are similar, and does not control the display apparatus to display the input area when the first face image and the second face image are not similar; and counting the number of the second face images acquired, wherein the second image is generated to display the input area in a different display mode according to whether the first face image and the second face image are similar when the number of the second face images is smaller than a predetermined number.

16. A non-transitory storage medium storing a computer-readable program to cause a computer to execute the program which executes the following steps of:

generating a first image to display content on a display apparatus;

generating a second image to display an input area to input additional information with respect to the content in a different display mode according to whether a first face image and a second face image are similar on the display apparatus when the second face image similar to the first face image satisfies a predetermined condition;

acquiring the first face image included in photographed image data captured by photographing a viewing user of the content;

acquiring the second face images included in the content; and controlling the display apparatus to display the input area when the first face image and the second face image are similar, and does not control the display apparatus to display the input area when the first face image and the second face image are not similar, wherein the content includes a plurality of items of still image data arranged in a page, and when a ratio of the number of still image data in which the second face image similar to the first face image exists to the total number of still image data in the page is larger than a predetermined value or when the number of still image data in which the second face image similar to the first face image exists is larger than a predetermined value, the second image to display the input area is generated.

17. A non-transitory storage medium storing a computer-readable program to cause a computer to execute the program which executes the following steps of:

generating a first image to display content on a display apparatus;

generating a second image to display an input area to input additional information with respect to the content in a different display mode according to whether a first face image and a second face image are similar on the display apparatus;

acquiring the first face image included in photographed image data captured by photographing a viewing user of the content;

acquiring the second face images included in the content; and controlling the display apparatus to display the input area when the first face image and the second face image are similar, and does not control the display apparatus to display the input area when the first face image and the second face image are not similar; and counting the number of the second face images acquired, wherein the second image is generated to display the input area in a different display mode according to whether the first face image and the second face image are similar when the number of the second face images is smaller than a predetermined number.

\* \* \* \* \*